(No Model.)
G. W. GOULD.
SPREADER FOR THRASHERS.
No. 310,671. Patented Jan. 13, 1885.
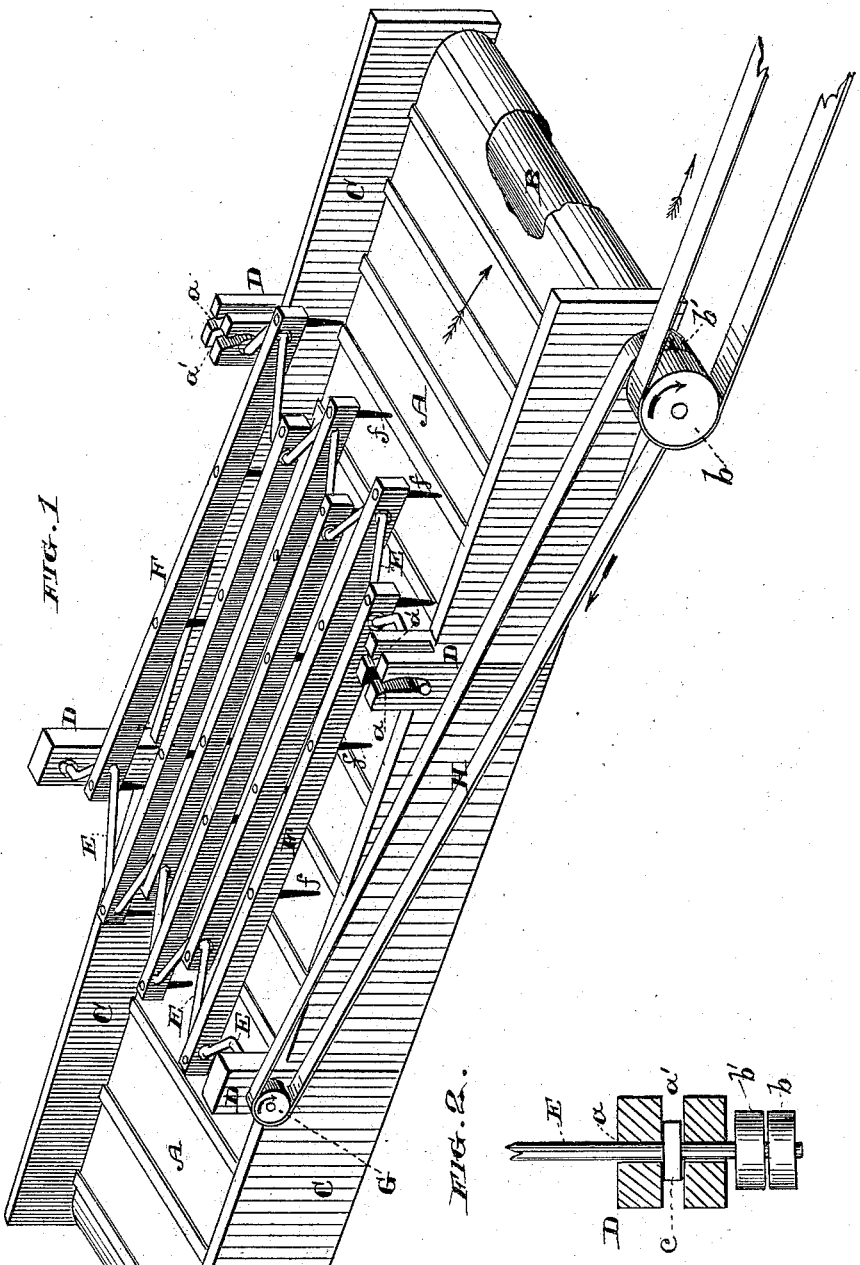

UNITED STATES PATENT OFFICE.

GEORGE W. GOULD, OF YOLO STATION, CALIFORNIA.

SPREADER FOR THRASHERS.

SPECIFICATION forming part of Letters Patent No. 310,671, dated January 13, 1885.

Application filed May 16, 1884. (No model.)

*To all whom it may concern:*

Be it known that I, GEORGE W. GOULD, of Yolo Station, county of Yolo, and State of California, have invented an Improvement in Spreaders for Thrashers; and I hereby declare the following to be a full, clear, and exact description thereof.

My invention relates to a new and useful spreader for thrashing-machines, the object of which is to effect an even and regular feed of the unthrashed straw to the separator.

My invention consists in the arrangement and combination of devices, all of which I shall hereinafter fully explain by reference to the accompanying drawings, in which—

Figure 1 is a perspective view of my spreader. Fig. 2 is a horizontal cross-section of one of the forward standards, D, showing its cross-slots and the arrangement of shaft and box therein.

A is the belt or draper, mounted on end pulleys, B, the forward one of which carries a pulley, $b$, which is to receive a suitable driving-belt to rotate it in a manner to cause the forward rotation of the belt in the direction indicated by the arrows.

C are sides of a frame, from which rise standards D, in which are mounted the crank-shafts E. Upon these crank-shafts are mounted the bars F, which carry the downwardly-projecting pickers or teeth $f$. Upon the rear crank-shaft is a pulley, G, from which a belt, H, extends to a pulley, $b'$, on the forward drum. Motion is thus transmitted to the pickers, which I describe as an alternately reciprocating rising and falling backward and forward motion. As the pickers are lowered they move back against the direction of travel of the belt, and as they rise they move forward. In thus rising they free themselves entirely of the straw moving forward on the belt, and in falling they take hold of the straw again and retard it, pulling it to pieces, tearing up the bunches, and spreading it out evenly, whereby a steady and regular feed is produced. They cannot become clogged, as they would have a tendency to be if they simply vibrated back and forth, remaining in the straw all the time, and they produce their entire effect in one direction—namely, backward—whereby they have no tendency to force too large a feed forward or rebunch the straw after tearing the bunch up. The rear crank-shaft is higher than the forward one, whereby the rear of the picker series is raised to permit the ready entrance of the straw. In the forward standards are made slots $a$ at right angles with the belt, and slots $a'$ at right angles with the slots $a$. The slots $a$ are curved somewhat, as shown. In the slots $a'$ are fitted and guided the boxes $c$, in which the ends of the crank-shafts are journaled, said ends extending within the slots $a$. By means of these slots the crank-shaft is adapted to move vertically, carrying the picker-bars with it, which move on the rear crank-shaft as a center, thereby necessitating the curvature of the slots $a$. When a heavy feed gets under the pickers, they rise on their forward ends, and are thus self-regulating, accommodating themselves to heavy or light feeds. The rear crank-shaft should also be vertically adjustable by means which would fix it wherever set, as there is no need to make it self-adjustable.

Any suitable ones of the cranks may be formed at a greater or less angle, to avoid a dead-center in the operation of the machine.

Having thus described my invention, what I claim as new, and desire to secure by Letters Patent, is—

1. In a spreader for thrashers, the combination of the endless traveling carrier-belt or draper A with the picker-bars F, having teeth $f$, the crank-shafts E, upon which said bars are mounted, said crank-shafts being rotated in a direction to carry the pickers down and move them back against the direction of travel of the belt and raise them and carry them forward with the direction of its travel, substantially as herein described.

2. In a spreader for thrashers, the combination of the endless forwardly-traveling carrier-belt or draper A, having drums B, with the picker-bars F, having teeth $f$, the crank-shafts E, carrying the bars, the pulleys $b\ b'$ on the forward drum, B, the pulley G on the rear crank-shaft, and the belt H, all arranged and operating in the manner and for the purpose described.

3. In a spreader for thrashers, the picker-bars F, having teeth $f$, in combination with the crank-shafts E, upon the cranks of which said bars are mounted, the rear crank-shaft being fixed in a horizontal plane, and the forward one mounted loosely and adapted to be vertically adjusted by the pressure of the underlying passing grain and straw, substantially as herein described.

4. In a spreader for thrashers, the belt A, sides C, and standards D, the forward standards having a curved slot, $a$, and a cross-slot, $a'$, in combination with the picker-bars F, having teeth $f$, the crank-shafts E, mounted in the standards, the forward shaft having its ends extending into the slots $a$, and journal-boxes $c$, fitted to slide in the cross-slots $a'$, substantially as and for the purpose herein described.

In witness whereof I have hereunto set my hand.

GEORGE W. GOULD.

Witnesses:
JOSEPH A. SAFFORD,
A. GRIFFITH,
C. V. BURKE.